(12) United States Patent
Naoi et al.

(10) Patent No.: US 12,015,878 B2
(45) Date of Patent: Jun. 18, 2024

(54) TRAIN MONITORING SYSTEM AND TRAIN MONITORING METHOD

(71) Applicant: HITACHI KOKUSAI ELECTRIC INC., Tokyo (JP)

(72) Inventors: Hironori Naoi, Tokyo (JP); Satoshi Masuda, Tokyo (JP); Tetsuya Ito, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 214 days.

(21) Appl. No.: 17/634,005

(22) PCT Filed: Aug. 22, 2019

(86) PCT No.: PCT/JP2019/032765
§ 371 (c)(1),
(2) Date: Feb. 9, 2022

(87) PCT Pub. No.: WO2021/033304
PCT Pub. Date: Feb. 25, 2021

(65) Prior Publication Data
US 2022/0321839 A1    Oct. 6, 2022

(51) Int. Cl.
*H04N 7/18*     (2006.01)
*G06Q 10/02*    (2012.01)
*G06V 20/59*    (2022.01)

(52) U.S. Cl.
CPC ............ *H04N 7/183* (2013.01); *G06Q 10/02* (2013.01); *G06V 20/593* (2022.01)

(58) Field of Classification Search
CPC ....... H04N 7/183; G06V 20/593; G06Q 10/02
See application file for complete search history.

(56) References Cited

U.S. PATENT DOCUMENTS

2011/0082714 A1    4/2011    Gaikwad
2017/0200355 A1    7/2017    Gruenbaum et al.

FOREIGN PATENT DOCUMENTS

| EP | 3349440 A1 | | 7/2018 |
|----|------------|---|--------|
| JP | 2002021149 A | | 1/2002 |
| JP | 2002045402 A | | 2/2002 |
| JP | 2002183720 A | * | 6/2002 |
| JP | 2007156666 A | | 6/2007 |

(Continued)

OTHER PUBLICATIONS

Extended European Search Report for corresponding EP Patent Application No. 19941905.2 dated Mar. 6, 2023 (6 pages).

(Continued)

*Primary Examiner* — Girumsew Wendmagegn
(74) *Attorney, Agent, or Firm* — Greer, Burns & Crain, Ltd.

(57) ABSTRACT

A train monitoring system in the present embodiment is provided with a compartment camera 10 that takes an image of the inside of a compartment of the train, a processing server 30 that calculates a vacancy probability for each reserved seat on the basis of the image taken by the compartment camera 10 while the train is running and detects a resale candidate seat by comparing the vacancy probability with a threshold value, and a touch panel monitor 40 that displays resale candidate seat information indicating the resale candidate seat that has been detected by the processing server 30.

8 Claims, 4 Drawing Sheets

(56) References Cited

FOREIGN PATENT DOCUMENTS

| | | | |
|---|---|---|---|
| JP | 2011210125 A | 10/2011 |
| JP | 2017212647 A | 11/2017 |
| JP | 2018113602 A | 7/2018 |

OTHER PUBLICATIONS

JP Office Action and machine translation for corresponding JP Patent Application No. 2021-541422 dated Nov. 18, 2022 (11 pages).
Int'l. search report issued in PCT/JP2019/032765, mailed Oct. 8, 2019.

* cited by examiner

TRAIN MONITORING SYSTEM AND TRAIN MONITORING METHOD

TECHNICAL FIELD

The present invention relates to a train monitoring system that uses a camera for taking an image of the inside of a compartment of a train.

BACKGROUND ART

In order to support a smooth operation of a railway, various types of inventions have been proposed so far. For example, Patent Literature 1 discloses a system where a plurality of cameras attached to each car of a train take an image of a door and its vicinity, and a plurality of camera images are allocated to each area of the divided display region on a monitor within a cabinet.

PRIOR ART LITERATURE

Patent Literature

Patent Literature 1: JP2018-113602A

SUMMARY OF THE INVENTION

Problems to be Solved

In the case where the state of the seats in terms of whether or not they are occupied by passengers can be grasped during the operation of a railway, it becomes possible to resell tickets for the seats that are not being used in spite of the fact that they have been reserved. In addition, the disclosure of the information on the unoccupied seats to the passengers provides an advantage for the passengers to be able to easily find a seat. In this manner, it has been desired to increase the service level for the operation of a railway by grasping the state of the seats in terms of whether or not they are occupied by passengers.

The Prior Art includes a system for detecting whether or not a person is sitting on a seat with a weight sensor that is embedded in the seat, and a system for detecting an object on a seat by means of an infrared ray sensor that is equipped on the ceiling. In the system that uses a weight sensor, such a problem arises that it is necessary to provide a weight sensor for every seat. In the system that uses an infrared ray sensor, such a problem arises that one infrared ray sensor could monitor two to four seats, and thus, it is necessary to arrange a great number of infrared ray sensors.

In addition, an increase in the number of sensors leads to an increase in the number of wiring cables, which also increases the costs for procuring and equipping them. Furthermore, an increase in the number of devices lowers the reliability of the entire system, which thus leads to an increase in the maintenance costs. Moreover, it is difficult for the above-described two types of sensor systems to cope with various situations in response to the movements of the passengers from the point of view of detection precision. For example, there is a concern of the occurrence of problems such that baggage on a seat can be mistakenly detected as a passenger, or a passenger may fail to be detected due to the way they are sitting.

It is required for systems, of which the purpose is to resell tickets, to grasp the status with high precision in order to make a final determination; however, it is difficult for the above-described sensor systems to grasp the situation with high precision. The systems cannot own the responsibility in the case where a ticket is resold in spite of the fact that a passenger is sitting on the seat. Therefore, visual confirmation by a person is necessary instead of leaving it for the system for the final determination in the state where a certain level of precision cannot be guaranteed such as in an automated car. In the above-described conventional systems, whether or not a passenger is actually sitting on a seat is determined only on the basis of sensor information, and thus, there is a lack of information in order for a railway operator to resell a ticket.

The present invention is provided in view of the above-described conventional state, and an object thereof is to provide a train monitoring system that is effective for finding a reserved seat that is unlikely to be used by a passenger.

Solution to Problems

In order to achieve the above-described object, the present invention provides a configuration of a train monitoring system as follows.

The train monitoring system according to the present invention is characterized by being provided with: a camera that takes an image of the inside of a compartment of a train; a server that calculates the probability of being vacant or occupied for each reserved seat on the basis of the image that has been taken by the camera while the train is running, and detects a resale candidate seat by comparing the probability with a threshold value; and a monitor that displays information on the resale candidate seat that has been detected by the server.

Here, the server may have such a configuration as to specify a reserved seat on the basis of seat reservation information that is provided by another system, and calculate the probability on the basis of the detection status of an object in the range that corresponds to the reserved seat within the image.

In addition, the server may have such a configuration as to increase or decrease the probability in response to the detection status of an object in the range that corresponds to the reserved seat within the image every time a predetermined period of time has elapsed.

Furthermore, the server may have such a configuration as to have a table that stores the probability for each reserved seat and reset the table every time the train stops at a station.

Moreover, the monitor may have such a configuration as to have a first display region that displays information on one or more resale candidate seats, and a second display region that displays an image showing the reserved seat that corresponds to the resale candidate seat selected from the first display region by an operator.

In addition, the configuration may allow the information on the resale candidate seat displayed on the monitor to include information for identifying the resale candidate seat and the probability that has been calculated for the corresponding reserved seat.

Furthermore, the configuration may allow the monitor to further display the occupation state of a toilet on the train.

Moreover, the configuration may allow the monitor to further display an image of the inside of a catering car on the train.

Advantageous Effects of the Invention

The present invention can provide a train monitoring system that is effective for finding a reserved seat that is unlikely to be used by a passenger.

DESCRIPTION OF EMBODIMENTS

The train monitoring system according to one embodiment of the present invention is described in reference to the drawings.

Figure 1:
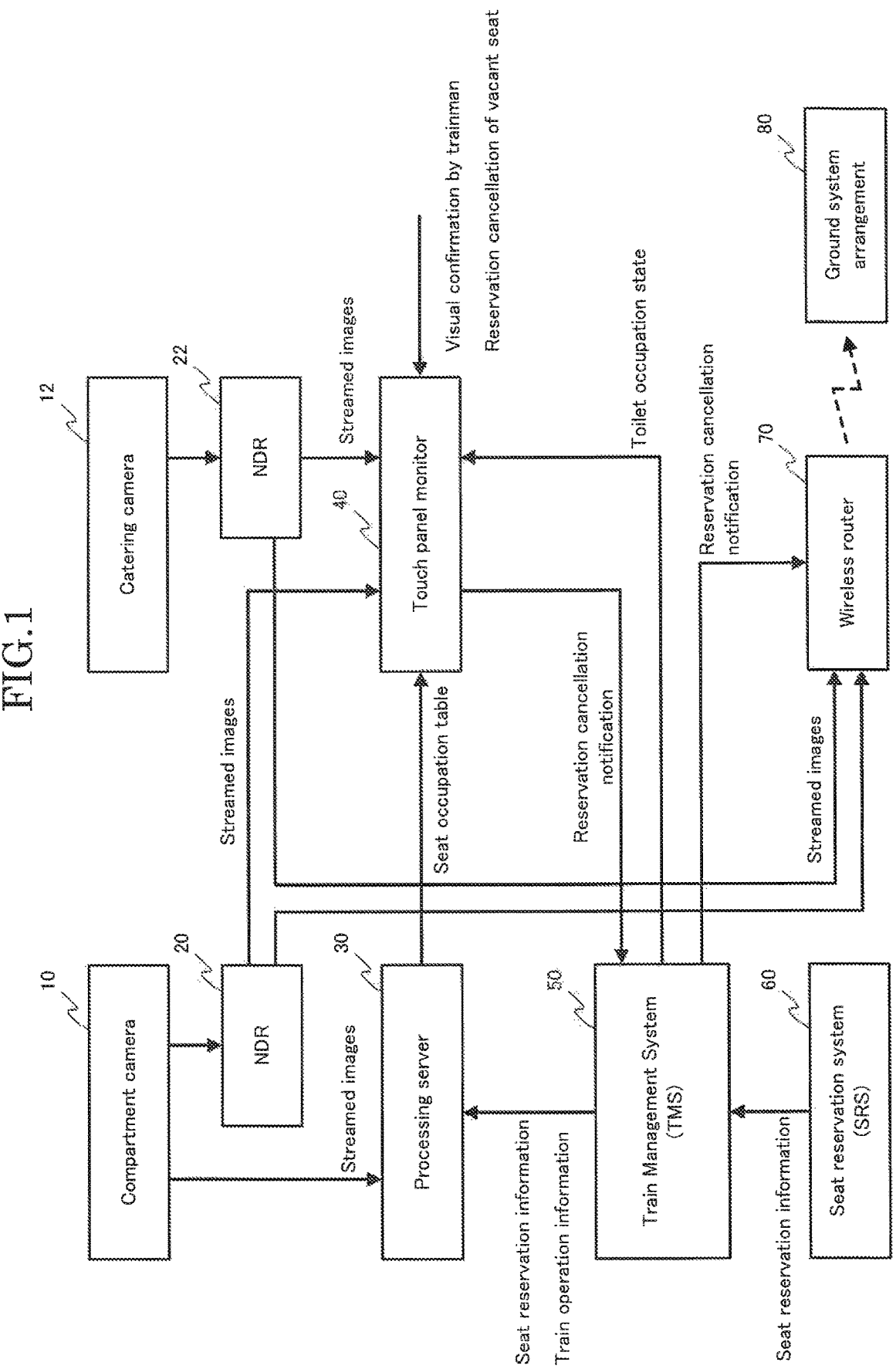
FIG. 1 is a diagram showing an example of the configuration of the train monitoring system according to one embodiment of the present invention.

FIG. 1 is a diagram showing an example of the configuration of the train monitoring system according to one embodiment of the present invention. The train monitoring system in the present embodiment is provided with a compartment camera 10, a catering camera 12, an NDR (Network Digital Recorder) 20, an NDR 22, a processing server 30, a touch panel monitor 40, a train management system (TMS) 50, a car seat reservation system (SRS) 60, a wireless router 70, and a ground system arrangement 80.

The compartment camera 10 is attached to a compartment in each car that forms the train and takes an image of the inside of the compartment. The catering camera 12 is attached to a catering car for supplying food and drink within the train and takes an image within the catering car. The attachment of the compartment camera 10 is implemented in such a manner that a dome camera having a wide-angle lens is equipped on the ceiling of the compartment, in such a manner that a box-type camera is embedded in a wall of the compartment and the like. The same can be applied to the attachment of the catering camera 12.

The NDR 20 records an image that has been taken by the compartment camera 10 and has a function of delivering the image in response to a request. The NDR 22 records an image that has been taken by the catering camera 12 and has a function of delivering the image in response to a request. In FIG. 1, the NDR 20 and the NDR 22 are provided separately; however, these may be integrated.

The processing server 30 analyzes an image that has been taken by the compartment camera 10 while the train is running, calculates the probability of vacancy for each reserved seat (probability of a passenger not sitting on the seat), and detects a resale candidate seat by comparing the probability of vacancy with a threshold value. The process by the processing server 30 is described below in detail.

The touch panel monitor 40 is a display device that can accept a touch operation from the user and is installed within a train cabinet so as to be used by a trainman (including a driver) on the train. The touch panel monitor 40 displays resale candidate seat information indicating the resale candidate seats that have been detected by the processing server 30. The touch panel monitor 40 also displays an image of the inside of the compartment that has been taken by the compartment camera 10 and an image of the inside of the catering car that has been taken by the catering camera 12.

Though not shown, a switching hub is provided within each car. The switching hub in each car is connected in a cascade form through a network cable. In addition, the switching hub in each car is connected to the devices (the compartment camera 10, the catering camera 12, the NDR 20, the NDR 22, the processing server 30, the touch panel monitor 40 and the like) within the car. As a result, a CCTV (Closed-Circuit Television) system is constructed within the train.

Here, the touch panel monitor 40 may be a portable type that can be carried by a person. In addition, the touch panel monitor 40 may be installed in the ground system arrangement 80 (an operation command facility or a station management chamber, for example) so as to be used by a railway operator on the ground side. In this case, the information that has been gained in the CCTV system within the train can be transmitted to the ground system arrangement 80 through wireless communication by using the wireless router 70. In addition, a mere display device may be installed in place of the touch panel monitor 40 so as to accept a user operation by means of another input device.

The TMS 50 is an upper system for managing the operation status of the train. The SRS 60 is an upper system for managing the status of the seat reservations. The TMS 50 provides information such as train operation information that indicates the operation status of the train to the processing server 30. In addition, the TMS 50 acquires information such as seat reservation information that indicates the status of the seat reservations from the SRS 60 and provides the information to the processing server 30.

Figure 2:
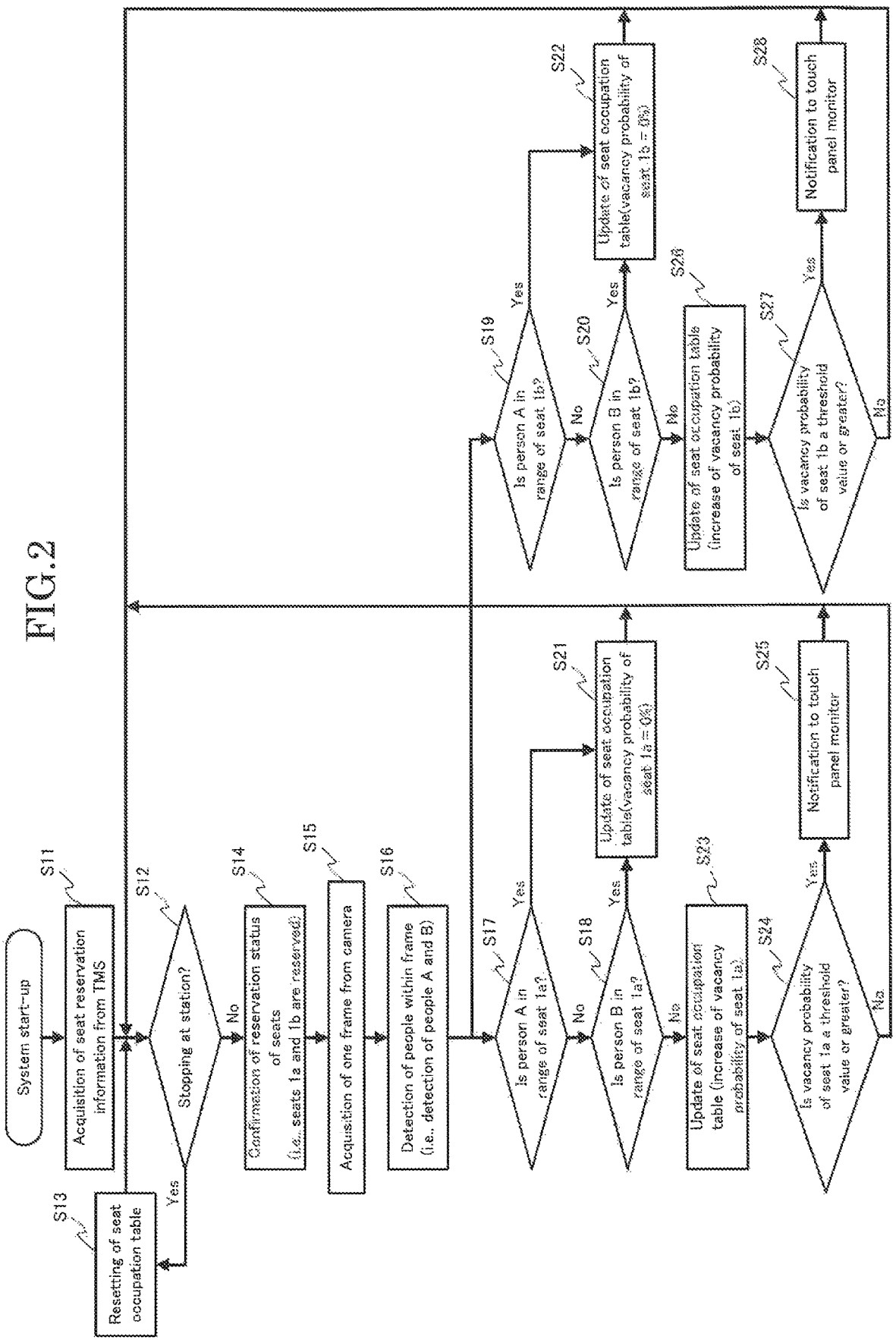
FIG. 2 is a flow chart for illustrating the process flow of the processing server in the train monitoring system in FIG. 1.
Figure 3:
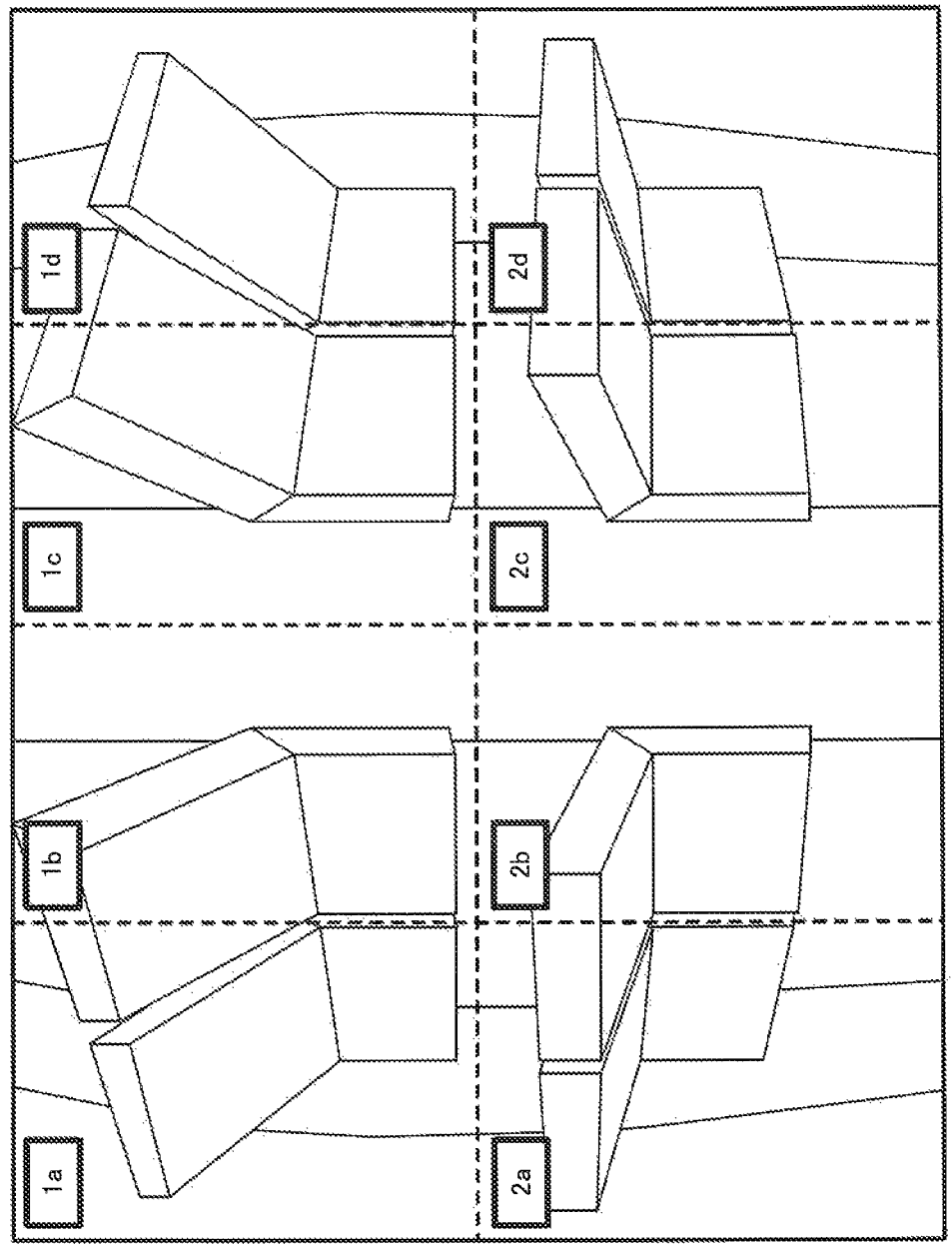
FIG. 3 is a diagram for illustrating an image taken by a compartment camera in the train monitoring system in FIG. 1.

Next, the process by the processing server 30 is described in reference to the process flow in FIG. 2. As shown in FIG. 3, a case where one compartment camera 10 takes an image of eight seats (1a, 1b, 1c, 1d, 2a, 2b, 2c, and 2d) is described as an example. Here, the respective compartment cameras 10 have a camera ID (a camera number, for example) for identifying the camera. In addition, the respective seats have a seat ID (a seat number, for example) for identifying the seat. Furthermore, data where the camera IDs of the compartment cameras 10, the seat IDs of the seats within the angle of the view (image region) of the compartment cameras 10, and area information ($X_{max}$, $X_{min}$, $Y_{max}$, and $Y_{min}$, for example) for identifying the range within the image frame of the seats are made to correspond with each other is registered with the processing server 30 in advance.

At the time when the operation of the train starts, the processing server 30 acquires train operation information from the TMS 50 and acquires seat reservation information from the SRS 60 via the TRS 50 (step S11). The train operation information includes an operation code (head code) where the route, the operation time, the stations at which the train is to stop, and the like are collected. The seat reservation information includes reservation IDs for identifying reservations, the seat IDs of the reserved seats, the stations at which the reservations start/end, and the like. The processing server 30 specifies which seats are reserved from which stations to which stations on the basis of the train operation information and the seat reservation information, and prepares a seat occupation table for managing the vacancy probability for each reserved seat. Reservation IDs, the seat IDs of the reserved seats, the stations at which the reservations start/end, the vacancy probabilities (the initial value is 0%) of the reserved seats, and the like are set in the seat occupation table.

The processing server 30 determines whether the train is running or has stopped at a station on the basis of the car velocity information that is gained from the TMS 50, for example (step S12). In the case where the train has stopped at a station, passengers frequently move within the cars, and therefore, the detection precision of vacant seats is lowered, which increases the possibility of an error in the detection. Therefore, in the case where the train has stopped at a station, the processing server 30 resets the seat occupation table for managing the vacancy probability of each reserved seat (step S13).

Meanwhile, in the case where the train is running, the vacancy seat detection process for analyzing an image of a compartment camera 10 so as to update the vacancy probabilities of the reserved seats is carried out as follows.

The processing server 30 first confirms the reservation status of the seats by referring to the seat occupation table (step S14). Here, it is assumed that the seats 1a and 1b have been reserved.

Next, the processing server 30 requests an image acquisition to the compartment camera 10 that takes an image of the region that includes a reserved seat so as to acquire an image for one frame (step S15), and thus analyzes the image frame so as to detect a person (step S16). It is possible to detect a person in accordance with an arbitrary technique. For example, in the case where an object region with a predetermined size or greater is sampled from the image, it may be determined that a person has been detected in the object region. Alternatively, in the case where an object region that has been sampled from the image has a characteristic amount that corresponds to a person, it may be determined that a person has been detected in the object region.

Next, the processing server 30 determines whether or not the detected person is within a range of a reserved seat (steps S17 through S20), carries out a process in response to the determination results (steps S21 through S28), and after that returns to step S12.

This is described by focusing on the seat 1a. In the case where it is determined that a person A is within the range of seat 1a (Yes in step S17) or in the case where it is determined that a person B is within the range of seat 1a (Yes in step S18), the vacancy probability of the seat 1a is set to 0% in the seat occupation table (step S21). Here, a predetermined value (20%, for example) may be subtracted from the vacancy probability of the seat 1b in the vacancy occupation table instead of setting the vacancy probability of the seat 1a to 0% in the seat occupation table.

Meanwhile, in the case where it is determined that neither the person A or the person B is within the range of the seat 1a (No in step S17 and No in step S18), a predetermined value (5%, for example) is added to the vacancy probability of the seat 1a in the seat occupation table (step S23).

After that, the processing server 30 determines whether the vacancy probability of the seat 1a is a threshold value (80%, for example) or greater (step S24). In the case where the vacancy probability of the seat 1a is a threshold value or greater (Yes in step S26), the processing server 30 detects the seat 1a as a resale candidate seat and notifies the touch panel monitor 40 of this so as to allow the touch panel monitor 40 to display to the effect that the seat 1a is a resale candidate seat (step S25).

The description continues by focusing on the seat 1b. In the case where it is determined that a person A is within the range of the seat 1b (Yes in step S19) or in the case where it is determined that a person B is within the range of the seat 1b (Yes in step S20), the vacancy probability of the seat 1b is set to 0% in the seat occupation table (step S22). Here, a predetermined value (20%, for example) may be subtracted from the vacancy probability of the seat 1b in the seat occupation table instead of setting the vacancy probability of the seat 1b to 0% in the seat occupation table.

Meanwhile, in the case where neither the person A or the person B is within the range of the seat 1b (No in step S19 and No in step S20), a predetermined value (5%, for example) is added to the vacancy probability of the seat 1b in the vacancy occupation table (step S26).

After that, the processing server 30 determines whether the vacancy probability of the seat 1b is a threshold value (80%, for example) or greater (step S27). In the case where the vacancy probability of the seat 1b is the threshold value or greater (Yes in step S27), the processing server 30 detects the seat 1b as a resale candidate seat and notifies the touch panel 40 of this so as to allow the touch panel 40 to display to the effect that the seat 1b is a resale candidate seat (step S28).

The above-described vacancy detection process is repeated every time a predetermined period of time has elapsed (that is to say, for every predetermined number of image frames) while the train is running. In the vacancy seat detection process, it is not necessary to track the behavior of the passengers, and it is merely necessary to be able to confirm that the reserved seat is in a vacant state over a long period of time, and thus, a reduction of the burden in the process in the processing server 30 may be achieved by setting a relatively long period of time (five seconds, for example) as the interval for repeating the vacancy detection process.

Figure 4:
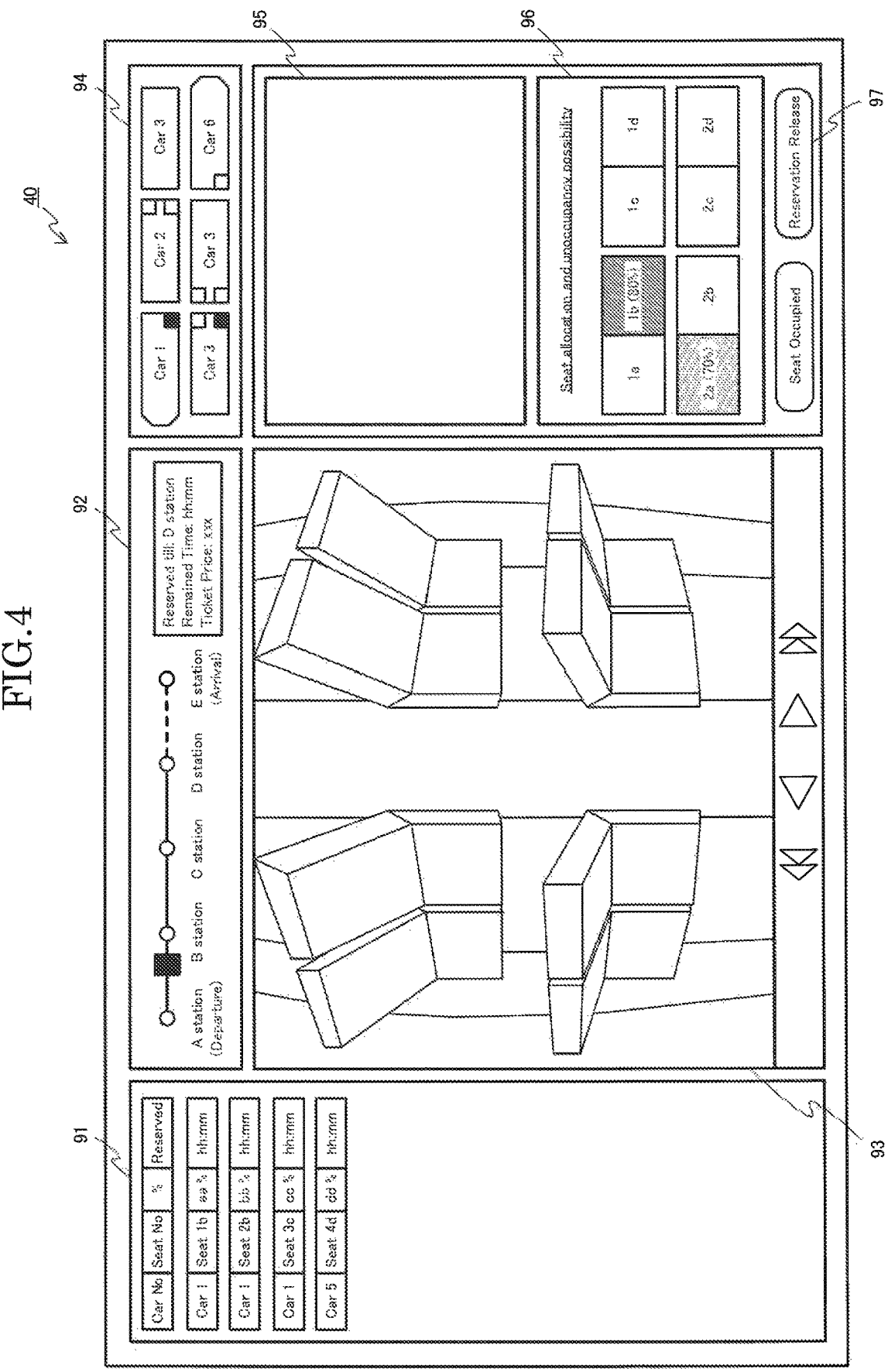
FIG. 4 is a diagram showing an example of the display on a touch panel monitor in the train monitoring system in FIG. 1.

Next, the display of resale candidate seat information on the touch panel monitor 40 is described in reference to the display example shown in FIG. 4.

The touch panel monitor 40 shown in FIG. 4 has a resale candidate seat list display region 91, an operation information display region 92, a camera image display region 93, a toilet occupation state display region 94, a catering car image display region 95, an image analysis content display region 96, and a reservation cancellation button 97.

The resale candidate seat list display region 91 is a region for displaying resale candidate seat information that indicates resale candidate seats (reserved seats of which the vacancy probability is a threshold value or greater) and displays one or more pieces of resale candidate seat information in a list form. As the resale candidate seat information, car IDs (car numbers, for example) for identifying the cars having a resale candidate seat, the seat IDs (seat numbers, for example) for identifying resale candidate seats, vacancy probabilities, the periods of time before the arrival at the destination stations of the reservations, and the like are displayed. In the case where a plurality of pieces of resale candidate seat information are displayed, the pieces of the resale candidate seat information are displayed in the order in which the vacancy probability is higher. Here, the resale candidate seat information may be displayed in other orders. For example, the pieces of the resale candidate seat information may be displayed in the order in which the remaining reserved section is longer by taking into consideration the time it takes for the resale of the reserved seat.

The operation information display region 92 is a region for displaying the operation information of the train. For example, the station from which the train departs, the respective stations at which the train is to stop, the station at which the train arrives, the current location of the train, and the like are displayed. In the case where any of the resale candidate seats are selected on the resale candidate seat list display region 91 by a user, the reservation information on the resale candidate seat (the destination station of the reservation, the time until the arrival at the destination station, and the like) is also displayed.

The camera image display region 93 is a region for displaying an image taken by a compartment camera 10. The camera image display region 93 displays an image taken by the compartment camera 10 of which the view angle includes the resale candidate seat that has been selected on the resale candidate seat list display region 91. The image displayed on the camera image display region 93 may be a real-time image or may be an image at a past arbitrary point in time designated by the user. Past images can be acquired by requesting the NDR 20.

The toilet occupation state display region 94 is a region for displaying the occupation state of a toilet in each car of the train. It is possible to acquire the information on the occupation state of a toilet from the TMS 50. As illustrated in FIG. 4, an image that schematically shows the formation of the train and the locations of the toilets may be used in order to make it possible for the users to easily grasp the occupation state of a toilet. The toilet occupation state display region 94 may display the occupation state in real-time or may display the occupation state of a past arbitrary point in time designated by a user. Here, the operation of the camera image display region 93 and the operation of the toilet occupation state display region 94 may be made in sync so that the toilet occupation state display region 94 can display the occupation state of a toilet at the same time as an image being shown on the camera image display region 93.

The catering car image display region 95 is a region for displaying an image that has been taken by a catering camera 12, that is to say, an image of the inside of the catering car. The catering car image display region 95 may display a real-time image or may display an image at a past arbitrary point in time designated by a user. In addition, the operation of the camera image display region 93 and the operation of the catering car image display region 95 may be made in sync so that the catering car image display region 95 can display an image that has been taken at the same time as the image being shown on the camera image display region 93.

The image analysis result display region 96 is a region for displaying the results of analysis of an image that shows the resale candidate seat that has been selected on the resale candidate seat list display region 91 (that is to say, the image that is being displayed in the camera image display region 93). As illustrated in FIG. 4, the displayed vacancy probability overlaps the image that schematically shows each seat within the image, and at the same time, the display mode (backdrop and color, for example) of each seat is varied in accordance with the vacancy probability, and thus, it becomes possible for a user to easily grasp the vacancy probability. In the case where another resale candidate seat that has not been selected on the resale candidate seat list display region 91 is included within the image that is being displayed on the camera image display region 93, the vacancy probability of this resale candidate seat is displayed at the same time.

The reservation cancellation button 97 accepts from a user an operation for cancelling the reservation of the resale candidate seat that has been selected on the resale candidate seat list display region 91. When a touch operation is carried out on the reservation cancellation button 97, a reservation cancellation notification is transmitted to the TMS 50. Upon the reception of the reservation cancellation notification from the touch panel monitor 40, the TMS 50 transmits the reservation cancellation notification to the ground system arrangement 80 through the wireless router 70.

As described above, the train monitoring system in the present embodiment is provided with a compartment camera 10 that takes an image of the inside of a compartment of a train, a processing server 30 that calculates the vacancy probability for each reserved seat on the basis of the image taken by the compartment camera 10 while the train is running and detects a resale candidate seat by comparing the vacancy probability with a threshold value, and a touch panel monitor 40 that displays resale candidate seat information indicating the resale candidate seat that has been detected by the processing server 30.

Such a configuration allows a reserved seat that is not likely to be used by a passenger to be automatically detected through image analysis and to be presented to a trainman as a resale candidate seat. Accordingly, the trainman can spare the time and effort for finding a reserved seat that is not being used by a passenger, and thus can reduce their workload. In addition, problems that would accompany a weight sensor or would arise in the case where a weight sensor is used in terms of a great number of devices that are equipped, an increase in the cost for equipment, a decrease in the system reliability, and an increase in the maintenance costs can also be solved.

The train monitoring system in the present embodiment has such a configuration in which the processing server 30 specifies a reserved seat on the basis of the seat reservation information provided by the SRS 60 through the TMS 50 and calculates the vacancy probability on the basis of the state of detection of a person in the range that corresponds to the reserved seat within an image taken by a compartment camera 10. Such a configuration makes it suffice to analyze only the range where there is a reserved seat within an image, and therefore, the burden of processing by the processing server 30 can be reduced as compared to the case where the entire image is analyzed.

In addition, the train monitoring system in the present embodiment has such a configuration where the processing server 30 increases or decreases the vacancy probability on the basis of the state of detection of a person in a range that corresponds to a reserved seat within an image taken by a compartment camera 10 every time a predetermined period of time has elapsed. Such a configuration makes it unnecessary to constantly analyze the image taken by the compartment camera 10 in order to calculate the vacancy probability, and thus can calculate the vacancy probability efficiently. Here, the calculation method described in the present embodiment is a mere example, and the vacancy probability may be calculated in accordance with another calculation method.

Furthermore, the train monitoring system in the present embodiment has such a configuration where the processing server 30 has a seat occupation table that stores the vacancy probability for each reserved seat, and resets the seat occupation table every time the train stops at a station. Such a configuration can prevent the calculation precision of the vacancy probability from lowering due to the movement of passengers when the train has stopped at a station.

Moreover, the train monitoring system in the present embodiment has such a configuration where the touch panel monitor 40 has a resale candidate seat list display region 91 that displays information on one or more resale candidate seats, and a camera image display region 93 that displays an image showing the reserved seat that corresponds to the resale candidate seat information selected on the resale candidate seat list display region 91 by an operator. Such a configuration allows a trainman, who is the user of the touch panel monitor 40, to confirm the image of the resale candidate seat when it is determined whether or not the reservation of the resale candidate seat can actually be cancelled.

In addition, the train monitoring system in the present embodiment has such a configuration where the resale candidate seat information displayed on the touch panel monitor 40 includes the seat ID for a resale candidate seat and the vacancy probability that has been calculated for the seat. Such a configuration allows a trainman, who is the user of the touch panel monitor 40, to confirm the vacancy probability of the resale candidate seat when it is determined whether or not the reservation of the resale candidate seat can actually be cancelled.

Furthermore, the train monitoring system in the present embodiment has such a configuration where the touch panel monitor 40 further displays the occupation state of a toilet on the train. Such a configuration allows a trainman, who is the user of the touch panel monitor 40, to confirm the occupation state of the toilet on the train when it has been determined whether or not the reservation of the resale candidate seat can actually be cancelled. That is to say, it becomes possible to determine the cancellation of the reservation of the resale candidate seat, taking into consideration the possibility of the passenger who made the reservation for the resale candidate seat staying in the toilet.

Moreover, the train monitoring system in the present embodiment has such a configuration where the touch panel monitor 40 further displays an image taken by the catering camera 12 that shows the inside of the catering car on the train. Such a configuration allows a trainman, who is the user of the touch panel monitor 40, to confirm the image showing the inside of the catering car when it has been determined whether or not the reservation of the resale candidate seat can actually be cancelled. That is to say, it becomes possible to determine the cancellation of the reservation of the resale candidate seat, taking into consideration the possibility of the passenger who made the reservation for the resale candidate seat staying in the catering car.

Here, the vacancy probability is calculated on the basis of the status of detection of a person in a range that corresponds to the reserved seat within an image in accordance with the above description. However, the vacancy probability may be calculated on the basis of the status of detection of an object having a predetermined size or greater, taking into consideration a case where the passenger may have left the seat but left luggage (a bag or a coat, for example) on the seat.

In addition, the occupation probability of each reserved seat (probability of a passenger sitting on the seat) may be calculated in place of the vacancy probability for each reserved seat, and the occupation probability may be compared with a threshold value (20%, for example) so as to detect a resale candidate seat.

The present invention is described above in detail; however, the present invention is not limited to the above-described configurations, and it is needless to say that the invention may be implemented with a configuration other than the above. For example, an interface for notifying the passengers of information on the resale candidate seats may be provided in order to encourage the passengers to find seats smoothly through the interface.

It is also possible to provide the present invention as a method or a system in which the process according to the present invention is implemented, a program for implementing such a method or system by means of a computer having hardware resources such as a processor or a memory, a recording medium for storing such a program, or the like.

INDUSTRIAL APPLICABILITY

The present invention can be applied to various types of train monitoring systems using a camera for taking an image of the inside of a train compartment.

REFERENCE SIGNS LIST

10: Compartment camera
12: Catering camera
20, 22: NDR
30: Processing server
40: Touch panel monitor
50: TMS
60: SRS
70: Wireless router
80: Ground system arrangement

The invention claimed is:

1. A train monitoring system, comprising:
a camera that takes an image of the inside of a compartment of a train;
a server that calculates the probability of being vacant or occupied for each reserved seat on the basis of the image that has been taken by the camera while the train is running, and detects a resale candidate seat by comparing the probability with a threshold value; and
a monitor that displays information on the resale candidate seat that has been detected by the server,
wherein the information on the resale candidate seat displayed on the monitor includes information for identifying the resale candidate seat and the probability that has been calculated for the corresponding reserved seat.

2. The train monitoring system according to claim 1, wherein the server specifies a reserved seat on the basis of seat reservation information that is provided by another system, and calculates the probability on the basis of the detection status of an object in the range that corresponds to the reserved seat within the image.

3. The train monitoring system according to claim 1, wherein the server increases or decreases the probability in response to the detection status of an object in the range that corresponds to the reserved seat within the image every time a predetermined period of time has elapsed.

4. The train monitoring system according to claim 1, wherein the server has a table that stores the probability for each reserved seat and resets the table every time the train stops at a station.

5. The train monitoring system according to claim 1, wherein the monitor has a first display region that displays information on one or more resale candidate seats, and a second display region that displays an image showing the reserved seat that corresponds to the resale candidate seat selected from the first display region by an operator.

6. The train monitoring system according to claim 1, wherein the monitor further displays the occupation state of a toilet on the train.

7. The train monitoring system according to claim 1, wherein the monitor further displays an image of the inside of a catering car on the train.

8. A train monitoring method by means of a camera that can be used to take an image of the inside of a compartment of a train, the method comprising steps of:
calculating, by a server that is connected to the camera so as to be communicable, the probability of being vacant or occupied for each reserved seat on the basis of an image that has been taken by the camera while the train is running, and detecting a resale candidate seat by comparing the probability with a threshold value; and causing, by the server, a monitor to display information on the resale candidate seat, wherein the information on the resale candidate seat displayed on the monitor includes information for identifying the resale candidate seat and the probability that has been calculated for the corresponding reserved seat.

* * * * *